US007232475B2

(12) United States Patent
Kritzler

(10) Patent No.: US 7,232,475 B2

(45) Date of Patent: Jun. 19, 2007

(54) CHEMICAL UPGRADING OF FILTERS

(75) Inventor: Steven Kritzler, Cronulla (AU)

(73) Assignee: Novapharm Research (Australia) Pty. Ltd., Rosebery, NSW (AU)

( * ) Notice: Subject to any disclaimer, the term of this patent is extended or adjusted under 35 U.S.C. 154(b) by 0 days.

(21) Appl. No.: 10/239,713

(22) PCT Filed: Mar. 27, 2001

(86) PCT No.: PCT/AU01/00337

§ 371 (c)(1),
(2), (4) Date: Nov. 14, 2002

(87) PCT Pub. No.: WO01/73355

PCT Pub. Date: Oct. 4, 2001

(65) Prior Publication Data

US 2003/0119693 A1 Jun. 26, 2003

(30) Foreign Application Priority Data

Mar. 29, 2000 (AU) .................................... PQ6562

(51) Int. Cl.
*B01D 46/02* (2006.01)
*B01D 46/04* (2006.01)

(52) U.S. Cl. .......................... 95/274; 95/285; 510/476; 510/477; 510/488

(58) Field of Classification Search ................ 510/421, 510/475, 476, 477, 509, 506; 131/331, 332, 131/333, 334, 345, 359; 95/285; 55/524, 55/527, 528
See application file for complete search history.

(56) References Cited

U.S. PATENT DOCUMENTS

| | | | | | |
|---|---|---|---|---|---|
| 2,638,180 | A | | 5/1953 | Herkimer | |
| 3,017,239 | A | * | 1/1962 | Rodman | 96/226 |
| 3,532,637 | A | | 10/1970 | Zeff et al. | |
| 3,947,576 | A | | 3/1976 | Kuczkowski et al. | |
| 4,126,674 | A | * | 11/1978 | Mausner | 424/31 |
| 4,374,814 | A | * | 2/1983 | Gaylord | 423/245.1 |
| 4,534,775 | A | | 8/1985 | Frazier | |
| 5,288,298 | A | | 2/1994 | Aston | |
| 5,290,894 | A | | 3/1994 | Melrose et al. | |
| 5,370,597 | A | | 12/1994 | Genovese et al. | |
| 5,465,739 | A | * | 11/1995 | Perfetti et al. | 131/335 |
| 5,501,238 | A | | 3/1996 | Von Borstel et al. | |
| 5,690,127 | A | * | 11/1997 | Chapman et al. | 131/364 |
| 5,840,245 | A | | 11/1998 | Coombs et al. | |
| 5,846,603 | A | | 12/1998 | Miller | |
| 5,860,428 | A | | 1/1999 | Lesser et al. | |
| 5,872,111 | A | | 2/1999 | Au | |
| 5,922,776 | A | * | 7/1999 | Wellinghoff et al. | 514/772.3 |
| 5,975,086 | A | | 11/1999 | Lesser et al. | |
| 6,071,479 | A | * | 6/2000 | Marra et al. | 422/122 |
| 6,133,170 | A | * | 10/2000 | Suenaga et al. | 442/334 |
| 6,136,770 | A | * | 10/2000 | Cheung et al. | 510/384 |
| 6,153,228 | A | * | 11/2000 | Shibuya et al. | 424/539 |
| 6,224,655 | B1 | | 5/2001 | Messier | |
| 6,228,382 | B1 | | 5/2001 | Lindner et al. | |
| 6,271,187 | B1 | * | 8/2001 | Hodge et al. | 510/130 |
| 6,383,273 | B1 | | 5/2002 | Kepner et al. | |
| 6,543,753 | B1 | | 4/2003 | Tharp | |
| 6,589,321 | B2 | | 7/2003 | Kames | |
| 6,802,891 | B2 | * | 10/2004 | Kritzler | 95/285 |
| 2002/0182184 | A1 | * | 12/2002 | Pearl et al. | 424/93.4 |
| 2002/0189625 | A1 | * | 12/2002 | Bushby et al. | 131/365 |

FOREIGN PATENT DOCUMENTS

| | | | |
|---|---|---|---|
| GB | 846458 | | 8/1960 |
| GB | 2 021 435 | | 12/1979 |
| GB | 2021435 | * | 12/1979 |
| GB | 2 202 042 | | 9/1988 |
| GB | 2202042 | * | 9/1988 |
| GB | 2320691 | * | 1/1998 |
| GB | 2 320 691 | | 7/1998 |
| JP | 02180267 | * | 7/1990 |
| WO | WO 93/16749 | * | 9/1993 |
| WO | WO 96/22825 | * | 8/1996 |

OTHER PUBLICATIONS

Rote Liste Service: "Rote Liste", 1999, Rote Liste Service GMBH, Frankfurt.

U.S. Appl. No. 10/239,714, filed Nov. 14, 2002 and Amendment filed Apr. 19, 2004.

* cited by examiner

*Primary Examiner*—Gregory R. Del Cotto
(74) *Attorney, Agent, or Firm*—Nixon & Vanderhye, P.C.

(57) ABSTRACT

The invention provides a filter treated with a humectant which may optionally be in combination with a surfactant. The treatment may also include a water soluble rheology modifier to alter the viscosity of water drawn onto the filter by the humectant. A tackifier may also be added. The invention also provides compositions suitable for application to a filter to carry out the treatment. The invention provides a method of "upgrading" a filter using the treatments and compositions described.

9 Claims, No Drawings

CHEMICAL UPGRADING OF FILTERS

This application is the US national phase of international application PCT/AU01/00337 filed 27 Mar. 2001 which designated the U.S.

TECHNICAL FIELD

This invention relates to gas filters, and more particularly to a method and composition for improving the efficacy of filters such as are used to remove dust and such like particulate matter from an air stream in an air conditioning system.

The present invention was discovered while working with air-conditioning (including air-heating and air-cooling) system filters and is herein described in relation to that use, but it is believed that the invention will be applicable to filters used with gases other than air and to filters for use with systems other than for air-conditioning (for example to industrial filters such as used in clean rooms, furnaces, gas purification, automotive and other engine air intake filters etc) and is not limited to air-conditioning filters.

BACKGROUND ART

Filters for use in air conditioning systems of the kind commonly provided in office, residential and healthcare buildings typically employ as media nonwoven fiber mats made for example from polyester, cellulosic or glass fibers and are designed to filter airborne particles from air flowing through the media. In use, as the particulate material is filtered from the air stream, the filtrate builds up on the filter surface and in pores of the matt, with the consequence that the filter progressively presents increasing resistance to air flow. Eventually, the air resistance becomes so great that the filter must be removed for cleaning or replacement.

Filter cleaning is costly and inconvenient both in terms of labor cost and system downtime. It can also be dangerous due to the possibility of infection from build up of bacterial and fungal growth on the filtrate. Replacement of the filter is generally a significant cost. It is therefore highly desirable to extend the time interval between successive filter replacements and/or maintenance service as long as possible, provided that the energy costs of circulating air through the filter can be maintained within specification.

Filters are generally designed in terms of parameters such as fiber type, fiber diameter, fiber matt thickness, matt density/porosity, construction and other physical and mechanical properties to provide a structure which is effective at filtration down to a specified particle size, but which at the same time will not unduly restrict airflow and which will clog slowly rather than quickly. These conflicting desiderata are met by compromise among the physical and mechanical parameters to provide a filter construction of a specific "efficiency".

It is usual to "grade" filters under standardized test conditions which measure particle retention for particles of a given size (or size distribution) and given airflow The need to manufacture different grades to cater for specified requirements of different air-conditioning systems adds greatly to filter manufacturing and inventory costs. The filter grades applicable in Australia are G1, G2, G3, G4, F4, F5, F6, F7, F8, F9. This list is in order of increasing filter efficiency. Thus grade F9 is equivalent to a hepafilter (filters to below 0.2 microns), while G1 would filter out pigeons. These filter grades are more particularly defined in Australian Standard AS 1324.1

The present invention stems from the surprising discovery that the efficiency of a given filter construction can be improved by a chemical treatment so that for example a grade G3 filter prior to treatment is upgraded to perform at grade G4 or better level. The cost of the chemical treatment is significantly lower than the additional cost of manufacture of a higher grade filter. For example the cost of the chemical treatment is less than the additional cost of a grade G4 filter in comparison with a grade G3 in terms of its traditional construction. Furthermore, preferred embodiments of the invention allow a reduction in inventory since a number of "grades" of filter can be provided based on a single mechanical construction simply by varying the level and/or nature of chemical treatment applied to that structure.

Any discussion of the prior art throughout the specification should in no way be considered as an admission that such prior art is widely known or forms part of common general knowledge in the field.

Accordingly it is an object of the invention to provide an improved filter and/or means of retro—improving the efficiency of an existing filter by relatively simple means.

It is an object of preferred embodiments of the invention to upgrade a given construction of filter by one grade or more by applying a simple chemical treatment.

BRIEF DESCRIPTION OF THE INVENTION

According to a first aspect the invention provides a filter treated with a humectant.

In preferred embodiments of the invention the filter is treated with a humectant in combination with a surfactant. More preferably, the treatment further includes a water soluble rheology modifier which alters the viscosity of water drawn onto the filter by the humectant and/or includes a tackifier which increases tackiness on the filter.

According to a second aspect the invention provides a composition suitable for application to a filter comprising:

a humectant, and a surfactant.

Desirably, the composition further includes one or more rheological additives or tackifiers.

According to a third aspect the invention provides a method of "upgrading" (as herein defined ) a filter including the step of treating the filter with a composition according to the first or second aspect.

By "upgrading" is herein meant improving the performance exhibited by a filter of predetermined structure when tested by the method of "grading" for air filtration associated with air conditioning described in AS 1324.2

According to a fourth aspect the invention provides a method of gas filtration including the step of upgrading the filter efficiency by treating the filter with a composition according to the first or second aspects.

BEST MODES OF PERFORMING THE INVENTION

Various embodiments of the invention will now be described by way of example only.

EXAMPLE 1

A first composition according to the invention comprises:

| | |
|---|---|
| Calcium chloride (humectant) | 5%–25%% |
| Fluorad FC129 (Note 1) | 0.01% |
| Kathon 886 MW (Note 2) | 0.19% |
| Water | 83.80% |

Note 1: Fluorad is a fluorosurfactant obtainable from 3M Corporation
Note 2: Kathon 886 MW is a preservative available from Rohm & Haas Corp.

EXAMPLE 2

A preferred formulation of the treating solution is as follows:

| | |
|---|---|
| Calcium chloride (humectant) | 14–18% |
| Kathon 886 MW (biostat) | 0.19% |
| Fluorad FC129 (surfactant) | 0.01% |
| Vinyl ether/maleic anhydride | 0.85% |
| Water qs | 100% |

EXAMPLE 3

In the present example, air conditioning filters of a specification normally according to Australian grade "F5" were prepared. The filters were made from a needled non-woven polyester fibre fabric and had a total surface area of about 3.5 square meters. The filter thickness was 10-12 mm and its density was about 280-300 grams per square meter (gsm). A typical fiber diameter would be in the range of 6-15 denier.

Some of the filters were then treated by spraying with a solution according to example 2 to a level of 230 ml of treating solution per square meter. The treated filter was then dried using dry air. It will be understood that the filter could be coated by dipping or any other convenient method and dried using heat, reduced pressure or by any suitable means or combination of means. The dried filter was then placed into a sealed container, such as a sealed plastic bag, until ready for use. When the filter was to be used, it was removed from its sealed container, and placed in its operational position in an air-conditioning system.

A number of filters from the same batch remained untreated for use as controls.

The treated and untreated control filters were then graded by the method of AS1324.2 When tested by this method the untreated control filters were graded "F5". However the chemically treated filter was graded above "F6".

The preferred treatment (example 2) is very strongly hydroscopic, in use taking in moisture from the air passing through the filter and becoming a liquid and wetting the filter This liquid penetrates the filter wetting the fibers. Fiber wetting is further enhanced by the incorporation in the treatment of a surface active agent which ensures penetration against the air flow by virtue of low surface tension. The liquid also migrates into and through the filtrate building up on and in the filter.

Without wishing to be bound by theory, the inventor believes that the improvement in filter properties is related to the ability of the now wet filter to entrap dust particles, by virtue of wetting, which are smaller than the particle rating of the filter. To a first approximation, these particles normally travel at high speed through the fiber matrix bouncing off fibers until they are trapped at a location where two or more fibers converge to limit the cross sectional area, such that the area is smaller than the dust particle. In the filter wetted by humectant, the dust particle impinges upon fibers covered by water many atoms thick and is held to the fiber by surface tension. In addition, the inventor has observed that where fibers touch in the matrix surface tension/capillary action creates a build up of humectant solution and dust particles encounter even greater quantities of solution in which they become entrapped by surface tension, rather than by physical size. The physical barrier caused by the fiber matrix is unchanged in its ability to entrap larger particles. Therefore it appears that the ability of the "wetted" filter to entrap particles is enhanced in comparison to the "unwetted" filter.

It is desirable to incorporate into the treatment one or more rheological additives (e.g. viscosity modifiers, gelling agents, thixotropic agents or the like). These control the viscosity of the solution to prevent fine droplets of from being blown from the filter by the vigorous passage of air, and to assist in retaining the solution on the filter. The type and quantity of rheological additive can be selected having regards to conditions of use. The incorporation of tackifiers which increase the tackiness of the solution and assist in causing particles to stick to the filter or filtrate mass accumulating serves further to enhance the upgrading effect.

A preferred humectant for use in the invention is calcium chloride. Examples of other humectants include, but are not limited to, glycerol, sorbitol, ethylene glycol, PEG, propylene glycol, 1,3 butylene glycol, PCA (2-Pyrrolidone-5-carboxylic acid), sodium sulphate, sodium hydroxide, lactic acid and derivatives, sodium chloride and the like. Those skilled in the art will have no difficulty in selecting suitable humectants having regard to the composition of the filter and of the system in which it is to be used based on the disclosure herein contained. Some humectants also act as surfactants. One example is sodium-di-octyl-sulphosuccinate.

A preferred surfactant class for use in the invention is fluoro surfactants, such as Fluorad FC129. These are preferred because they have a profound ability to reduce surface tension. However other surfactants can be employed. By way of example only, the surfactant may be non-ionic (e.g. ethoxylates, propoxylates and block co-polymers of these two), anionic surfactants (such as sodium dodecylbenzene-sulphonate, sodium dioctylsulphosuccinate, sodium salts of sulphonated or sulphated organic ethoxylates or propoxylates), cationic surfactants (such as Cetrimonium Chloride or such as secondary, tertiary and quaternary organoamines) or even amphoteric surfactants (such Cocamidopropylene Betaine).

Examples of rheological agents which may be included are sodium carboxymethylcellulose; hydroxyethylcellulose; hydroxypropylcellulose; polyethylene glycols; polypropylene glycols; polyvinyl alcohol; polyvinyl acetate, polyvinylpyrrolidone and copolymers of these, hydroxypropyl guar, xanthan gum, chitosan, acrylated copolymers, polyacrylic polymers (carbopols) and the like. However many other water soluble polymers would be similarly advantageous. The type and quantity can be selected having regard to the teaching herein contained.

Other active ingredients may be incorporated into the formulation for permeation through the filtrate, for example fire retardants, airflow promoters or viscosity reducing agents, deodorisers and so forth. The formulation may also include a biocide or biostat in accordance with our copending application of even date, the disclosure of which is incorporated herein by reference.

Although the composition in the examples was applied to the filter from an aqueous solution or suspension, it may be possible and advantageous to apply the humectant and biostat to the filter as a solid or from a non aqueous solvent and such compositions are within the scope of the invention.

It will be understood that compositions according to the invention can be applied to filters of any material. Tests have been conducted with filters of polypropylene, viscose, rayon, cellulosics, and glass fiber. However the principle of operation herein described is adaptable to filters of other materials and of other construction (such as for example woven, non-woven, spunbond, meltblown, laminates and the like)

Although the invention has been described with reference to specific examples, it will be appreciated by those skilled in the art that the invention may be embodied in other forms without departing from the inventive concept herein disclosed.

The invention claimed is:

1. A method of upgrading an air conditioning particulate filter comprising the step of treating the filter with a humectant in combination with a florosurfactant and a water soluble polyvinyl alcohol rheology modifier present in an amount sufficient to wet the filter and to impart to the filter an ability to trap more particulates at an air throughput than can be trapped by a corresponding untreated air conditioning filter at the same air throughput.

2. A method of upgrading an air conditioning filter according to claim 1 wherein the humectant is selected from the group consisting of calcium chloride, glycerol, sorbitol, ethylene glycol, polyethylene glycol, propylene glycol, 1-3, butylene glycol, 2-Pyrrolidone-5-carboxylic acid, sodium sulphate, sodium hydroxide, lactic acid and derivatives thereof, sodium chloride and sodium dioctylsulphosuccinate.

3. A method of upgrading an air conditioning filter according to claim 2 wherein the humectant is calcium chloride.

4. A method of upgrading an air conditioning filter according to claim 1 wherein the filter is composed of a fiber selected from the group consisting of polypropylene, polyester, viscose, rayon, cellulosics, and glass fiber.

5. A method of upgrading an air conditioning particulate filter comprising the step of treating the filter with a humectant in combination with a surfactant and a water soluble vinyl ether/maleic anhydride copolymer rheology modifier present in an amount sufficient to wet the filter and to impart to the filter an ability to trap more particulates at an air throughput than can be trapped by a corresponding untreated air conditioning filter at the same air throughput.

6. A method of upgrading an air conditioning filter according to claim 5 wherein the humectant is selected from the group consisting of calcium chloride, glycerol, sorbitol, ethylene glycol, polyethylene glycol, propylene glycol, 1-3, butylene glycol, 2-Pyrrolidone-5-carboxylic acid, sodium sulphate, sodium hydroxide, lactic acid and derivatives thereof, sodium chloride and sodium dioctylsulphosuccinate.

7. A method of upgrading an air conditioning filter according to claim 6 wherein the humectant is calcium chloride.

8. A method of upgrading an air conditioning filter according to claim 5 wherein the surfactant is a fluoro surfactant.

9. A method of upgrading an air conditioning filter according to claim 5 wherein the filter is composed of a fiber selected from the group consisting of polypropylene, polyester, viscose, rayon, cellulosics, and glass fiber.

* * * * *